May 18, 1965    F. N. PIASECKI    3,184,183
FLYING PLATFORM
Filed Jan. 15, 1962    7 Sheets-Sheet 1
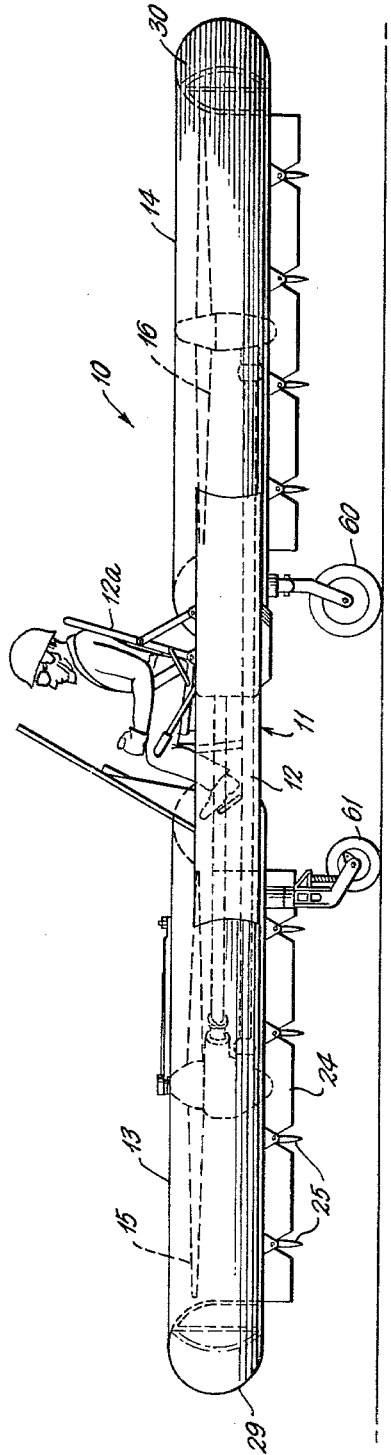
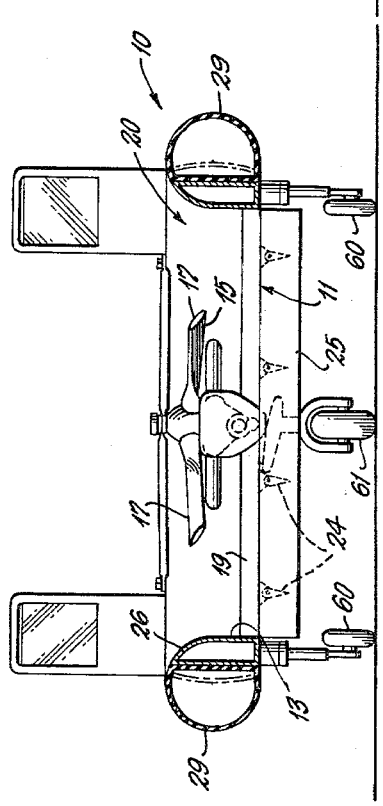
INVENTOR
*Frank N. Piasecki*
BY *Mason, Fenwick & Lawrence*
ATTORNEYS

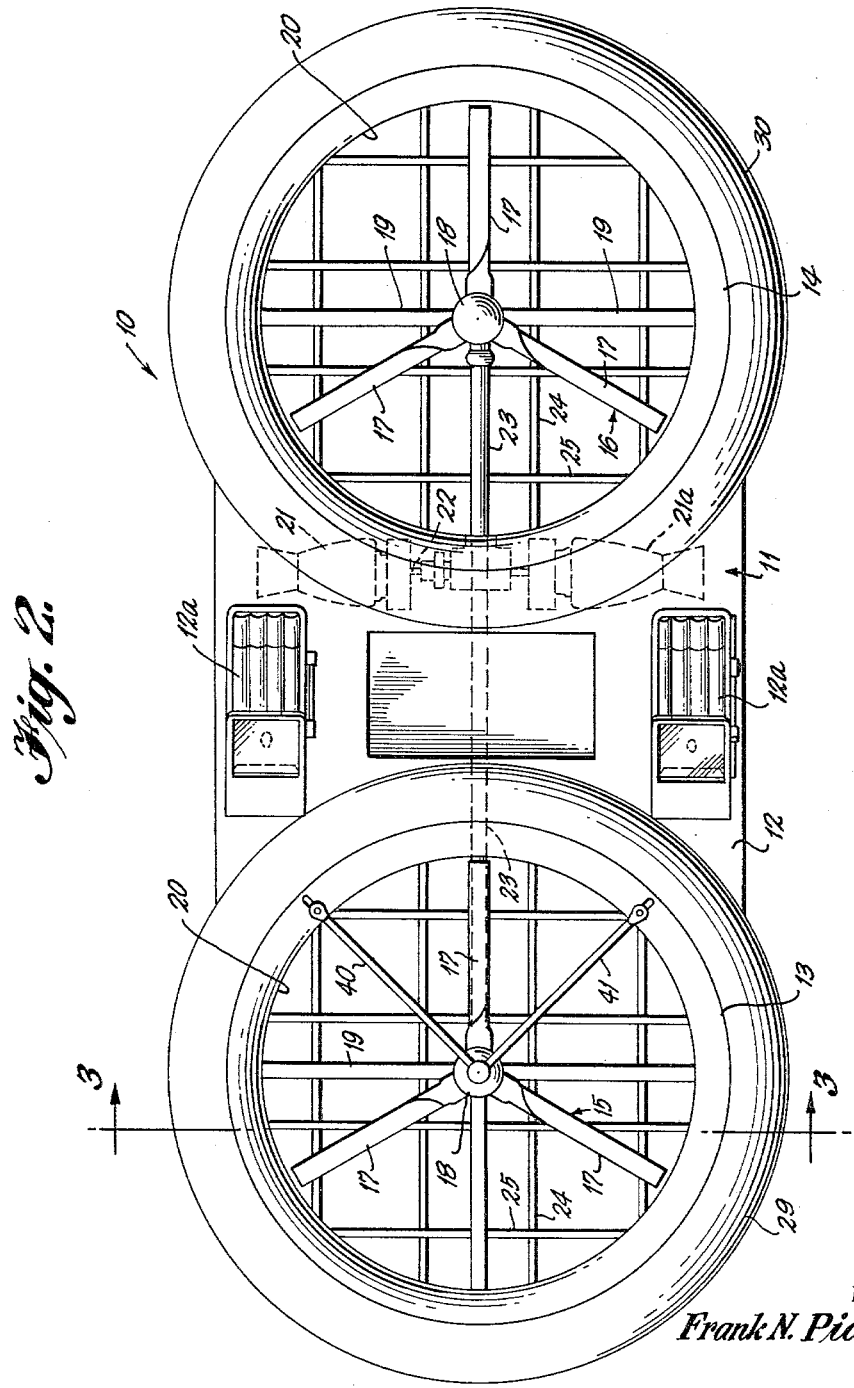

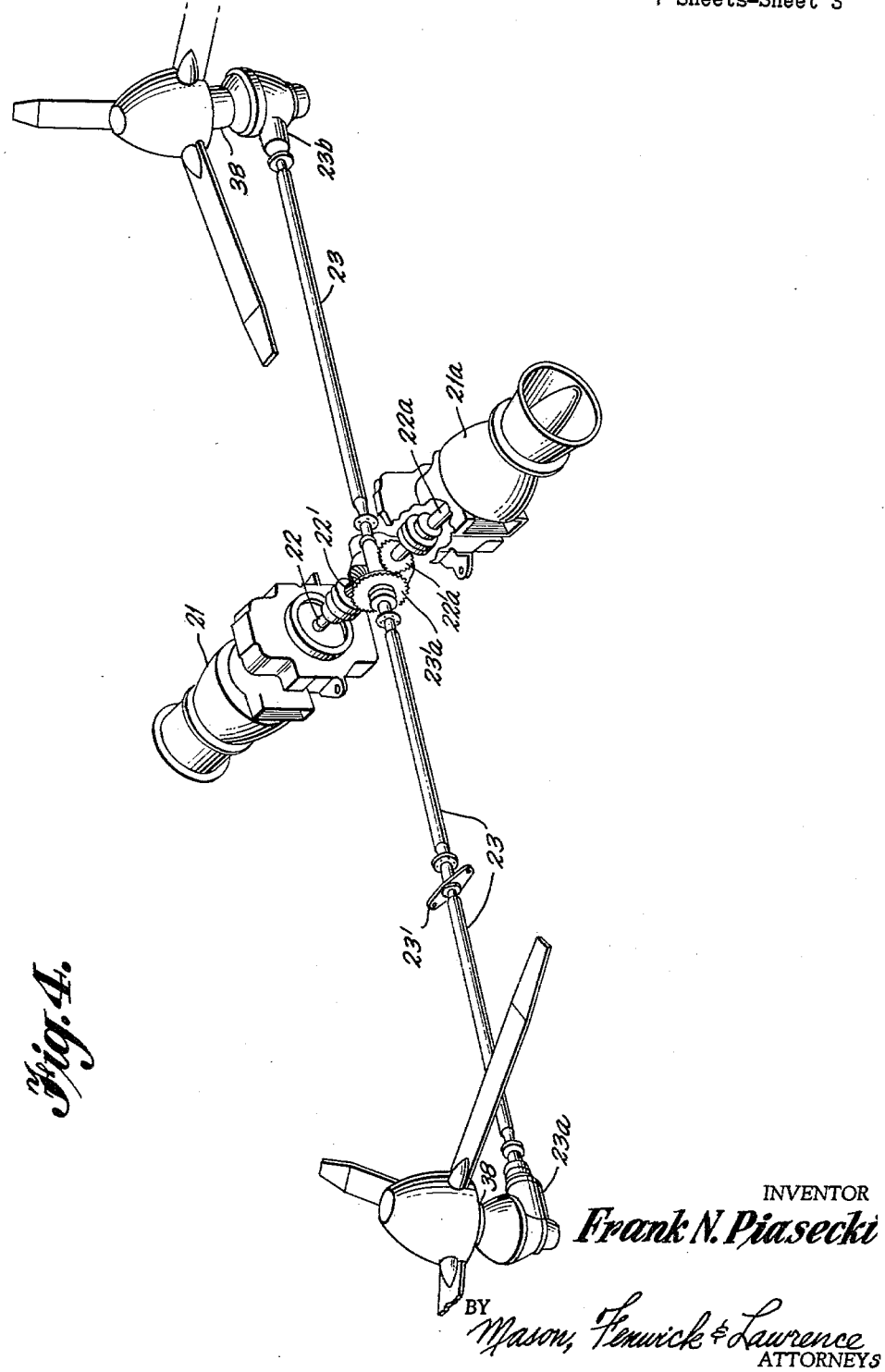

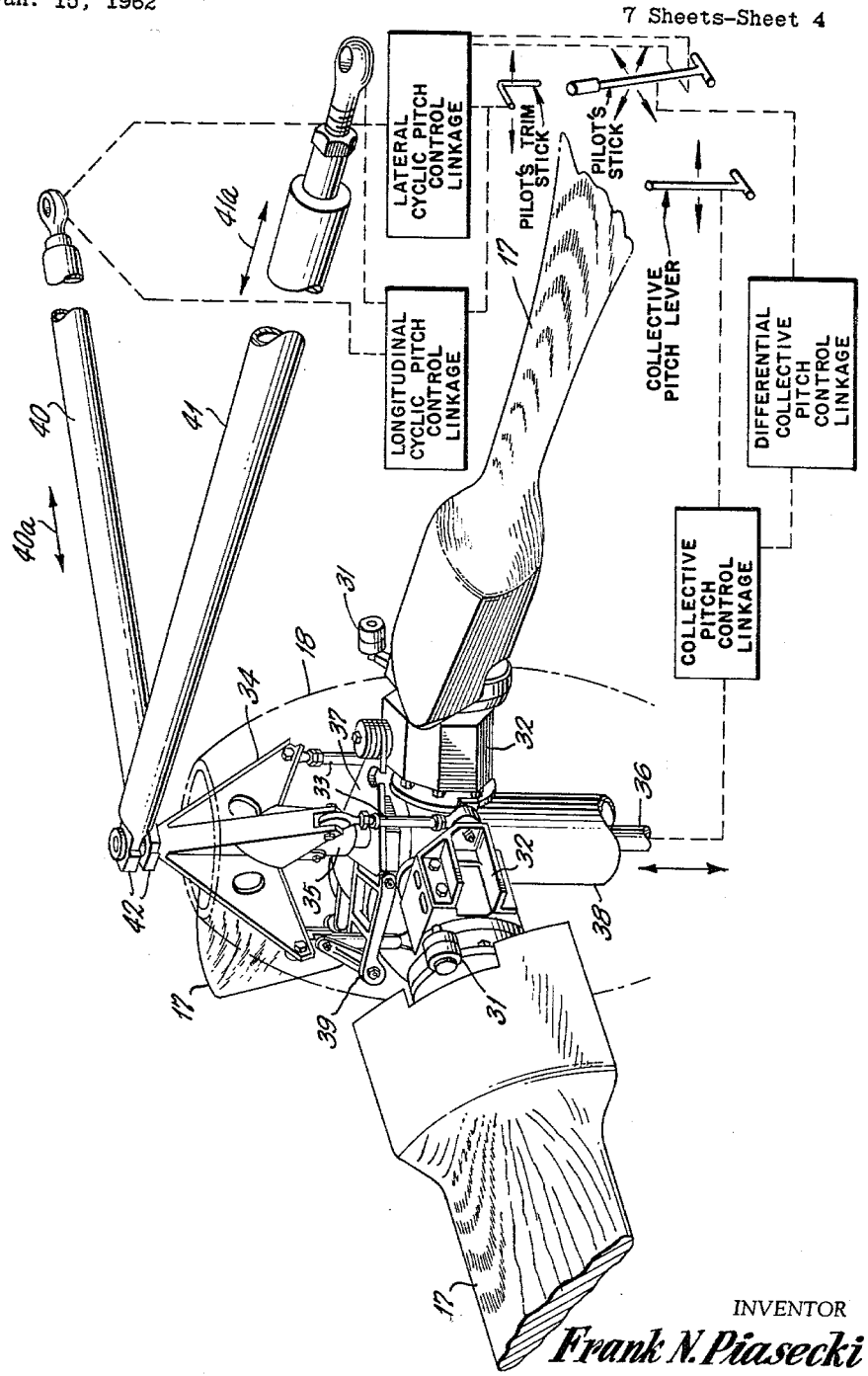

May 18, 1965
F. N. PIASECKI
3,184,183
FLYING PLATFORM
Filed Jan. 15, 1962
7 Sheets-Sheet 5
*Fig. 6ª*
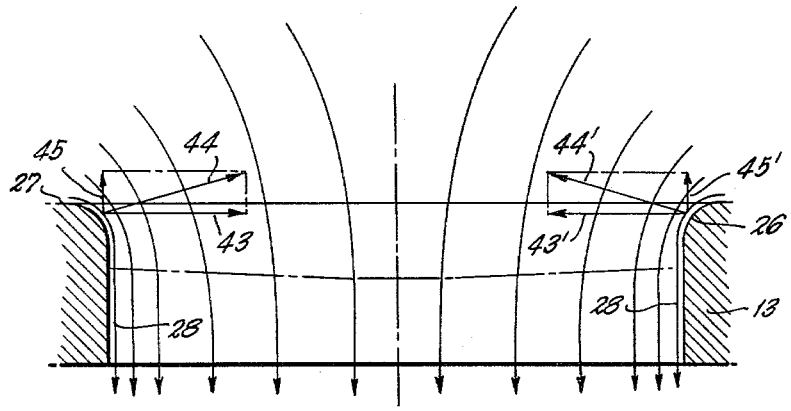
*Fig. 6ᵇ*
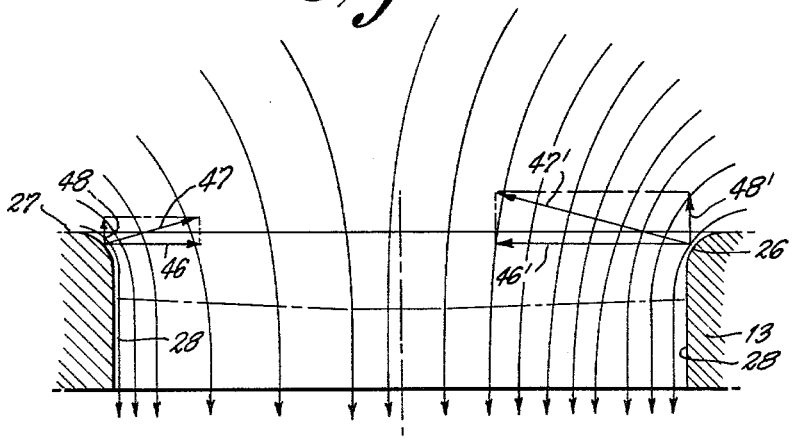
INVENTOR
*Frank N. Piasecki*
BY
*Mason, Fenwick & Lawrence*
ATTORNEYS May 18, 1965 F. N. PIASECKI 3,184,183
FLYING PLATFORM Filed Jan. 15, 1962 7 Sheets-Sheet 6

INVENTOR
*Frank N. Piasecki*

BY *Mason, Fenwick & Lawrence*
ATTORNEYS

INVENTOR
Frank N. Piasecki

United States Patent Office 3,184,183
Patented May 18, 1965

---

3,184,183
FLYING PLATFORM
Frank N. Piasecki, Haverford, Pa., assignor to Piasecki Aircraft Corporation, Philadelphia, Pa., a corporation of Pennsylvania
Filed Jan. 15, 1962, Ser. No. 166,291
5 Claims. (Cl. 244—23)

The present invention relates in general to aerial vehicles and more particularly to flying platforms of the vertical take off and landing type which are lifted and sustained in the air by rotatively powered ducted fans or rotors.

A general object of the present invention is the provision of a small, compact, highly maneuverable flying platform to be used in intimate cooperation with ground transportation facilities, and particularly a small flying platform to be used for transportation of personnel and/or small cargoes over any terrain, with or without roads, in connection with military operations. Smallness here is conceived to be in terms of existing ground facilities, such as roads, railroads, flatcars, flat bed trailers, wagons, tunnels, streets and alleys and the like so that the vehicle can be piloted in and about them.

A specific object of the present invention is the provision of a small flying platform of the vertical lift type having a plurality of shrouded propelling and lifting rotors disposed in tandem in alignment with the fore-and-aft axis of the platform, wherein the powerplant, rotors and controls are housed compactly in a flat, low chassis.

Another specific object of the present invention is the provision of a small flying platform of the vertical lift type having a plurality of shrouded propelling and lifting rotors disposed in tandem in alignment with the fore and aft axis of the platform, constructed in such a manner that the front rotor does not materially interefere with airflow entering the rear rotor.

Another specfic object of the present invention is the provision of a novel control linkage for a ducted vertical lift rotor for adjusting cyclic pitch and collective pitch of the rotating blades.

Another specific object of the present invention is the provision of a novel vertical lift type shrouded rotor assembly having means for decreasing the drag force produced at the front of the shroud lip in forward flight.

Another specific object of the present invention is the provision of a novel shrouded vertical lift rotor assembly having means for producing a propulsive force by controlling cyclic pitch on the rotors to vary air flow over the inlet lip of the duct defined by the shroud.

Another object of the invention is the provision of an aerial vehicle having shrouded vertical lift rotors wherein inflatable means are provided for minimizing interference with the air flow entering the shroud inlet, which means can be collapsed to permit reduction of over all length and width of the vehicle for storage or movement in cramped quarters.

Another object of the present invention is the provision of a novel flying platform structure having tandem ducted fans for providing propulsion and lift and means for increasing lift due to ground effect phenomena at low altitudes.

Another object of the present invention is the provision of a novel flying platform aircraft of the character described in any of the preceding paragraphs, wherein ground effect skirts or aprons are provided about the periphery of the platform to restrict the air exit and build up pressure under the aircraft to produce increased lift when the aircraft is near the ground due to ground effect.

Other objects, advantages, and capabilities of the present invention will become apparent from the following detailed description, taken in conjunction with the accompanying drawings illustrating several preferred embodiments of the invention.

In the drawings:

FIGURE 1 is a side elevation of a flying platform embodying the present invention;

FIGURE 2 is a top plan view thereof;

FIGURE 3 is a vertical transverse section view taken along the line 3—3 of FIGURE 2;

FIGURE 4 is a fragmentary perspective view illustrating the motors and drive connections to the rotors;

FIGURE 5 is a fragmentary perspective view of the hub portion of one of the lift rotors illustrating the novel control linkage of the present invention;

FIGURES 6a and 6b are diagrammatic illustrations of the air flow about a typical shroud inlet embodying the present invention, illustrating the forces produced for various blade pitch conditions;

Figure 7:
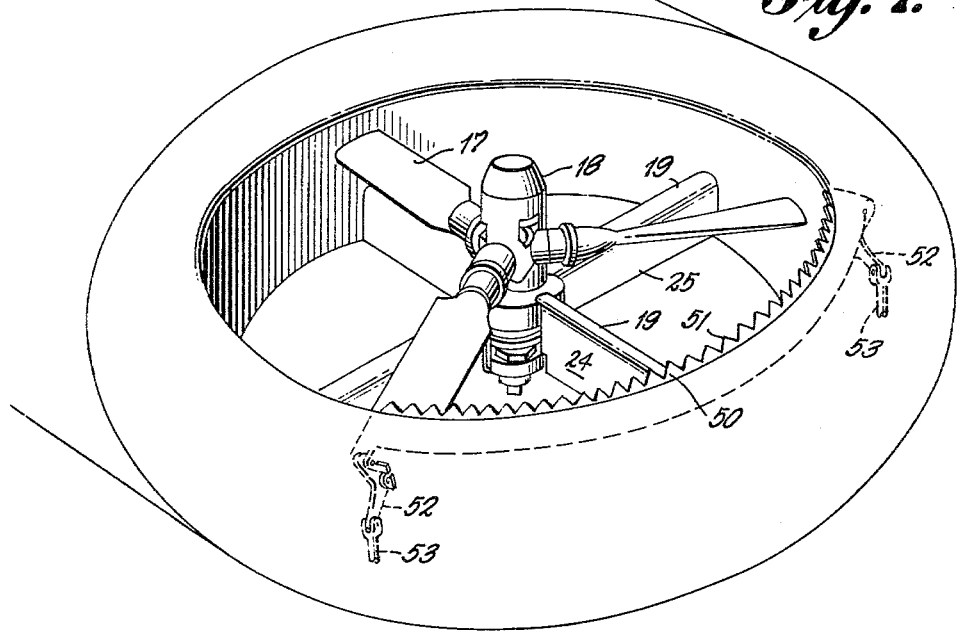
FIGURE 7 is a perspective view of a typical spoiler assembly for the shroud inlet lip to decrease drag forces produced in forward flight.

The basic configuration of the flying platform consists of two ducted fans or shrouded three-bladed rotors, arranged in tandem in alignment with the fore-and-aft axis of the vehicle, disposed in shrouds which form or are superposed over the leading and trailing ends of the vehicle, and completely shield the rotors on all sides. The shrouded rotor assemblies and the bridging or shroud supporting chassis of the vehicle are arranged to provide a generally rectangular flat platform which is elongated along the direction of travel, having rounded leading and trailing edges. The rotors turn in opposite directions so that the torque of one balances that of the other. By providing shrouded propellers, greater static thrust for a given amount of power can be created than with an unshrouded propeller of the same diameter, because additional thrust is produced by reduced pressure on the shroud inlet as will be later explained. The rotors are driven by one or more engines, and are connected through a gear train so that both rotors are always driven by the power plant system. The operator's seat and passenger or cargo compartment are in the center section between the rotors, and the entire chassis may be supported on wheels to provide ground maneuverability.

Referring now to the drawings, wherein like reference characters designate corresponding parts throughout the several figures, and particularly to the embodiment shown in FIGURES 1 to 4, the flying platform embodying the present invention is designated generally by the reference character 10 and comprises a flat, low chassis 11 having a central section 12 and generally cylindrical shrouds or rotor ducts 13, 14 located at the leading and trailing ends respectively of the chassis 11, the chassis being elongated in the fore-and-aft direction of travel and having the general configuration of a long, thick platform. Three-bladed rotors 15 and 16 having variable pitch blades 17 are disposed for rotation about vertical axes in the shrouds 13, 14 respectively and include a hub portion 18, the construction of which is more clearly shown in FIGURE 5, which may be supported on transmission and propeller supports 19 transversing the duct or opening 20 formed by the shrouds 13, 14. The rotors 15, 16 are driven from a common power plant, which in this embodiment comprises a pair of engines indicated at 21, 21a located in a common transverse axis in the central section 12 and having engine drive shafts 22, 22a terminating in spiral bevel pinions 22', 22'a in driving engagement with a spiral bevel gear 23'a keyed on a drive shaft 23. The drive shaft 23 is formed in three sections as shown, the forward section being journaled in bearing support 23', and the drive shaft terminating at opposite ends in rotor transmissions 23a, 23b formed of spiral bevel gears providing a driving coupling between the drive shaft 23 and the vertical rotor drive shafts 38. The central section 12 of the chassis will preferably house the controls, the fuel tank, and the like, and the operator and passenger seats, indicated at 12a, or operator's seat and cargo space are also provided in the central section 12.

Supported immediately under each of the rotors 15, 16 is a system of longitudinal and transverse movable slip stream deflecting vanes 24 and 25, which may be pivoted from their neutral position to deflect the air stream from the rotors fore-and-aft or to either side. Control of the aircraft about all axes is achieved by a combination of the movement of the vanes and pitch change of the rotors, as will be later described.

As will be apparent from inspection of FIGURES 3 and 6, the inner surface of the shroud or duct wall at the shroud inlet, as indicated at 26, is convexly curved from the straight portion of the annular top wall portion 27 surrounding the shroud to the straight portion 28 of the duct wall. Preferably this shroud inlet portion should be designed so that the air flow will not separate from the straight duct wall portion 28 which is below the inlet 26. To achieve this, there should be no discontinuity in the curvature at any point on the duct wall. Examples of curves which will produce this property are spirals, involutes and like curves without a tangent and straight line, and curves which have an inflection with zero curvature such as the sine curve.

Figure 8:
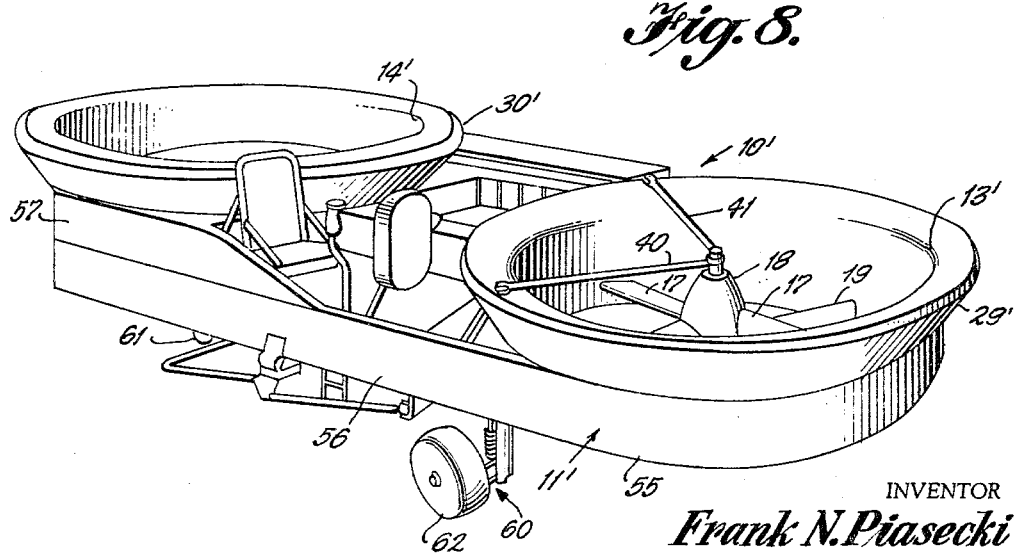
FIGURE 8 is a perspective view of a modified design of a flying platform embodying the present invention.

Supported on the chassis and extending around the outside of each of the shrouds 13, 14 are inflatable fairings 29 and 30 respectively which are formed of suitable flexible material having a hollow core for receiving air or other fluid medium under pressure. It will be understood that suitable valve means and a source of compressed air are provided to permit control of inflation and deflation of the fairings 29, 30 and to vary the inflation pressure thereof. The fairings 29, 30 when inflated, have a semicircular shape as illustrated in solid lines in the drawings to achieve minimum interference with the air flow entering the shroud inlet, and can be collapsed to the broken line position as illustrated in FIGURES 1 and 3 to permit a smaller overall length and width for storage, or for moving the vehicle on the ground in cramped quarters. For example, the vehicle may have an overall width of ten feet ten inches and an overall length of twenty-four feet six inches with the fairings inflated, and a width of nine feet two inches and length of twenty-two feet when the fairings are deflated. It is also possible to control the shape of the fairings by the distribution of material thickness in combination with a variable inflation pressure to control the flow for longitudinal trim and control purposes. An alternate shape for the fairings, for example, is illustrated in FIGURE 8.

A preferred construction of the hub portion of the rotors is illustrated in FIGURE 5. Referring to FIGURE 5, the blades 17 are each mounted for rotation on a spanwise or pitch changing axis in a known manner. There is no provision for a flapping hinge or lag hinge as in most helicopter rotors. One or more weights 31 are attached to each blade 17 so that the centrifugal force acting on these weights 31 balances the centrifugal twisting movement of the blades. Each blade 17 has attached to it an arm or extension bracket 32 to which is connected a vertically extending link 33. Connected to the upper ends of the links 33 is a spider member 34, having one arm provided for each blade 17. The spider member 34 is fastened to a universal joint 35, the lower end of which is connected to the upper end of a push-pull tube 36 which passes through the center of the rotor hub 37 and hollow drive shaft 38. The spider member 34, links 33 and push-pull tube 36 are caused to rotate with the hub 37 by the scissors mechanism 39 interconnected between the spider member 34 of one of the links 33 and the rotor hub 37, the scissors mechanism 39 including a pair of arms pivoted together at their adjacent ends and connected at their remote ends to the driving and driven member. By this arrangement, the spider member, links and push-pull tube 36 may be rotated about the axis of the rotor while being free to be shifted vertically relative to the rotor hub 37.

The tilt of the spider member 34 is constrained in the longitudinal and lateral directions by tilt control push-pull tubes 40 and 41, the push pull tubes 40 and 41 having bearings 42 at one of the ends thereof connected to the spider member 34 to provide for rotation of the spider member relative to the push-pull tubes 40, 41. The other ends of the push-pull tubes 40 and 41 are coupled to the pilot's controls to be moved by the pilot's controls in the direction shown by the arrows 40a and 41a. The low end of the push-pull tube 36 also runs in a bearing which is mounted in the actuating arm of a collective pitch control system of a type well known to persons skilled in this art.

It will be clear that as the spider member 34 is moved vertically, actuated by the push-pull tube 36, the pitch of each blade 17 of the rotor will be changed uniformly, that is, the collective pitch will be adjusted by the vertical movement of the push-pull tube 36. As the spider member 34 is tilted in a given plane by adjustment of the tilt control push-pull tubes 40 and 41 responsive to movement of the pilot's controls, the pitch of the rotating blades 17 will be changed progressively as they rotate. The pitch of each blade will be at a minimum when the link 33 for that blade is at the high point of the tilted rotating spider member 34, and the pitch of the blade will be a maximum 180° away.

As was previously stated, control of the aircraft about all axes is achieved by a combination of pitch change of the rotors and the movement of the slip stream deflecting vanes 24 and 25. Longitudinal control of the aircraft is achieved through three separate schemes acting singly or in combination.

The first scheme is termed differential collective pitch, wherein the collective pitch of the front rotor 15 is decreased while that of the rear rotor 16 is increased, or vice versa, by adjustment of their respective push-pull tubes 36. This causes the aircraft to tilt nose down, or nose up, respectively. After the aircraft is tilted, the tilted thrust vectors from the propellers will cause the aircraft to move forward or rearward respectively.

The second scheme of longitudinal control is termed longitudinal cyclic pitch, wherein the cyclic pitch of both rotors 15 and 16 is applied so that the blades are at a minimum pitch at the front of the duct and a maximum pitch at the rear of the duct. In this condition, each rotor will have a moment applied to it in a nose-down direction, since the blades are attached rigidly to the hub and cannot flap as they do in helicopters. In addition, the decreased pitch on the front of each rotor will cause a decreased air flow over the shroud inlet 26 in front, while the air flow over the shroud inlet 26 will be increased in the rear portion.

This is illustrated in FIGURES 6a and 6b, illustrating the resultant vector forces and the vertical and radial components thereof for symmetrical flow through the shroud duct when the pitch is uniform throughout rotation of the blades, in FIGURE 6a, and for unsymmetrical flow where the pitch is minimum at the front and maximum at the rear, in FIGURE 6b. It will be noted that in FIGURE 6a, the radial components 43 and 43' of the resultant vector forces 44 and 44' on the shroud inlet 26 are equal and in opposite directions so that they cancel out, and that the vertical components 45 and 45' are equal and in the same direction and combine to produce thrust. However, in the case of FIGURE 6b wherein the blade pitch is minimum at the front or left as viewed in this figure, and is maximum at the rear, the front radial component 46 of the resultant force 47 on the shroud inlet 26 is smaller than the rear radial component 46' of the rear resultant vector force 47' because the front resultant vector force 47 is smaller due to decreased air flow at that side of the duct, and the front vertical component 48 is shorter than the rear vertical component 48'. The vertical forces represented by the vectors 48 and 48' combine to produce thrust and a pitching moment (or rolling moment if the axis connecting the points of maximum and minimum thrust extends transversely of the aircraft). Propulsive force also results from this adjustment of the cyclic pitch of the rotors, as the radial forces 46 and 46' do not entirely cancel resulting in a net forward propulsive force. Also, in forward flight, the unsymmetrical flow through the shroud duct results in a drag force produced at the forward lip of the duct. Adjustment of the cyclic pitch can cause the effect illustrated in FIGURE 6b to counteract this drag force.

The third scheme for achieving longitudinal control is by pivoting of the transverse slip stream deflecting vanes 24, to deflect the air stream rearwards, thus producing a forward thrust, or by deflecting them forwardly to produce a rearward thrust.

The differential collective pitch scheme is used as the fundamental method of pitch control and is produced by fore-and-aft motion of the pilot's stick. The adjustment of longitudinal cyclic pitch and pivoting of the transverse slip stream deflecting vanes 24 are used as trimming controls, operated by a separate device in the cockpit.

Lateral control is achieved by means of cyclic pitch applied to both rotors 15 and 16 by means of lateral motion of the pilot's stick in such a way that the blades 17 are, for example, at a minimum pitch on the right side and a maximum pitch on the left side. This causes a moment to be exerted on the rotors and shrouds tilting the aircraft to the right. After the aircraft is tilted to the right, the tilted thrust vectors will cause the aircraft to move to the right. Tilting to the left is, of course, caused by control of the pilot's stick in the opposite direction. The longitudinal slip stream deflecting vanes 25 are also made to move by lateral motion of the pilot's stick. If they are tilted to the left, they will deflect the air to the left and produce a force to the right causing the aircraft to move to the right. At the same time, however, since the longitudinal vanes 25 are below the center of gravity, they will produce a moment tending to tilt the aircraft to the left. Thus, depending upon which way the longitudinal vanes are made to move, they can either produce a force causing the aircraft to move faster in the direction it is tilted, or can produce a moment adding to the tilting moment from the rotors.

Yaw control is accomplished by tilting the longitudinal slip stream deflecting vanes 25 under the front rotor 15, for example, to the left, and at the same time tilting the longitudinal vanes 25 under the rear rotor 16 to the right. This would produce a deflection of the air stream from the front rotor 15 to the left causing the nose or leading edge of the aircraft to move to the right, and at the same time the tail or trailing edge would move to the left. This control is actuated by the pilot's foot pedals.

It will be noted that the pilot's controls, namely the collective pitch lever, the stick and the pedals are the same as a conventional helicopter and their operation produce the same effect upon the aircraft, although the method of producing this effect is different. The linkage connections between the push-pull tubes 36, 40 and 41 and the pilot's stick, the collective pitch lever, and the pilot's trim control at the pilot's station are indicated diagrammatically by broken lines in FIGURE 5 as the mechanical linkages for accomplishing translation of motion of these controls into appropriate actuating motion of the tubes 36, 40 and 41 are well known to persons skilled in the helicopter art, typical examples of such linkages being disclosed in U.S. Patent No. 2,555,577 granted June 5, 1951 to Elliott Deland.

FIGURE 7 illustrates a spoiler construction which may be provided on the shroud inlet lip to decrease the drag force produced at the front of the shroud lip in forward flight. Referring to this figure, an arcuate spoiler member 50 having a serrated working edge 51 is slidably supported for movement from a projected position as illustrated in FIGURE 6 wherein the serrated portion thereof projects into the air stream along the forward sector of the shroud inlet 26 to a retracted position wherein the spoiler member 50 is wholly withdrawn into the shroud body. The spoiler member 50 may be positioned by any well-known control linkage, such, for example, as bell crank link members 52 illustrated in FIGURE 6 which are controlled by suitable connecting rods 53 and an appropriate linkage in the cockpit. The spoiler member 50, when occupying the projected position on the shroud inlet lip spoils the flow of air over that area which has been found to have an effect similar to the effect of cyclic pitch in that the drag force produced at the front of the shroud lip in forward flight can be decreased by this means.

FIGURE 8 illustrates a modified design of flying platform indicated generally by the reference character 10', wherein the chassis 11' is of stepped configuration with the upper surface of the forward and central portions 55 and 56 of the chassis disposed at a lower level than the top of the after section 57. In this particular form, the inflatable fairings 29' and 30' form uninterrupted annular fairings which surround only the annular upper portions of the shrouds 13' and 14' projecting above the top of the main chassis. The fairings 29', 30' have an external configuration which is slightly different from the semicircular shape of the fairings 29, 30. In forward flight, it has been found that the air flow entering the front rotor, in designs wherein the front and rear shrouds are at the same level interferes with the air flow entering the rear rotor causing less air to enter the rear rotor. This effect can be alleviated by the design illustrated in FIGURE 7 by disposing the inlet of the rear duct 14' at a higher level than the inlet of the front duct 13'.

Figure 10:
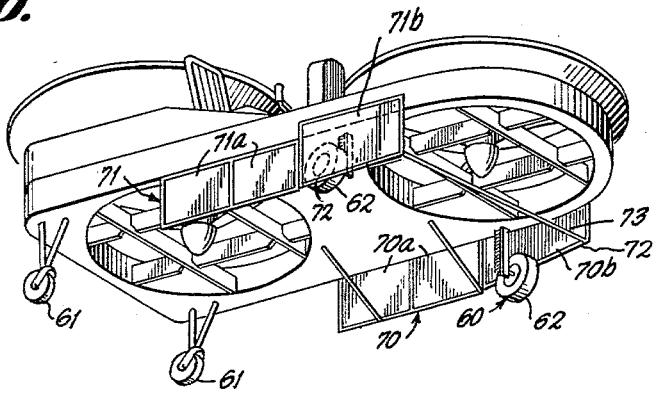
Figure 11:
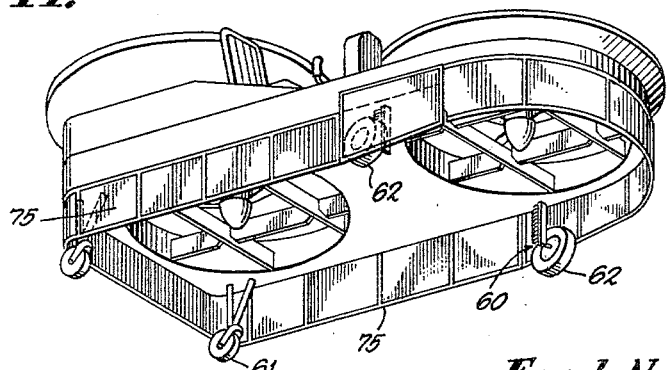

As illustrated in the drawings, each of the embodiments includes wheel assemblies indicated by the reference characters 60 and 61, some of which, for example the forward wheel assemblies 60, may have powered wheels 62 driven from the motors 21, 21a by a suitable conventional drive connection which may be selectively connected and disconnected, for example by a suitable remote control clutch means operated from the pilot's position. This aerial vehicle, by virtue of its design and construction and the lift and propulsion forces produced by its powered ducted fans, is not inherently limited to low altitudes and can fly at any reasonable altitude just as any other rotary or fixed wing aircraft does. By virtue of its powered wheels, it can be driven along the ground wherever the terrain is suitable at a great reduction in fuel consumption. Its versatility may be further increased by providing "ground effect" skirts or aprons about part or the entire periphery of the chassis 11. Such modifications incorporating exemplary "ground effect" skirt assemblies are illustrated in FIGURES 9 to 11, of the accompanying drawings.

The term "ground effect" relates in general to an increase in the aerodynamic "lift" of an aircraft due to its proximity to the surface over which it is flying. While several vehicles have been designed to take advantage of this phenomenon by providing downwardly directed flows of fairly high velocity air which has a restricted lateral escape path to produce an air cushion to suspend the craft, these so-called "ground effect" machines have been designed to operate only at very low altitudes of the order of one inch to several feet. However, all aircraft are affected by ground effect to a limited extent. Rotary wing aircraft are affected most strongly when barely off the ground, but this effect drops off with increase in altitudes until at a height equal to one rotor diameter the increase in lift is almost zero.

It has been discovered that by providing skirts or aprons, hereinafter termed ground effect skirts, along part or all of the perimeter of the chassis 11 of the flying platform craft, hereinbefore described, the air exit is restricted, the air velocity is reduced, and pressure is built up under the aircraft, tending to increase the lift due to ground effect. The flying platform craft, due to its ducted rotors and comparatively high rates of air flow, benefits from ground effect up to two or three times the rotor diameter.

Figure 9:
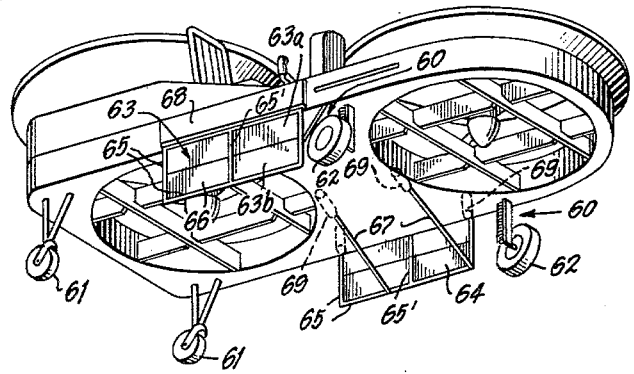
FIGURES 9, 10 and 11 are perspective views of other modifications of the flying platform employing ground effect skirts.

In the modification illustrated in FIGURE 9, side ground effect skirt units 63 and 64 are provided on the two sides of the aircraft substantially along only the central section 12 thereof. These ground effect skirt units 63 and 64 may, in one practical embodiment, comprise rigid peripheral framing members 65 and intermediate braces 65', if required, to which are fixed panels or sections of sheet material 66. The ground effect skirt units depend from the sides of the chassis 11 along the central section 12 to a level very close to the ground when the vehicle is supported on its wheel assemblies 60, 61. Inwardly and upwardly inclined bracing rods 67 extending from the lower edge framing members 65 to the bottom of the chassis 11 near the transverse center of the chassis may also be provided to retain the skirt units 63, 64 in proper position.

A further modified construction employing side ground effect skirts is illustrated in FIGURE 10, wherein the ground effect skirt units 70 and 71 extend along the sides of the chassis 11 from a point substantially transversely aligned with the center of the front rotor 15 to a point transversely aligned with the center of the rear rotor 16. It will be noted that the rearmost sections 70a, 71a correspond substantially to the construction of the ground effect skirt units 63 and 64 in FIGURE 9, and that a forward portion 70b, 71b of the skirt is formed of like framing members 72 and a transverse brace or braces 73 spanning the chassis transversely and interconnecting the two skirts 70 and 71 to restrain them in position.

It has been noted that the inclusion of ground effect skirt units of the type illustrated in FIGURE 9 produce a marked increase of lift and that the configuration illustrated in FIGURE 10 produces an even greater increase in lift throughout the ground effect altitudes. With these configurations, wherein the ground effect skirts are provided on the side of the aircraft only, its normal flight characteristics are not effectively changed but an improvement in ground effect lift is realized.

A further modification is illustrated in FIGURE 11, wherein ground effect skirts 75 are applied to the entire periphery of the chassis 11 to obtain maximum effectiveness in the ground effect region.

The "ground effect" skirts, by reducing the air exit, reducing the air velocity and building up pressure under the aircraft, in addition to usefully increasing lift over altitudes up to two or three times the rotor diameter, so increase lift when close to the ground where the air escape path between the lower edges of the skirts and the ground is very small that reductions of power up to twenty-five to fifty percent or a doubling of the payload may be achieved at a height of six inches. The "ground effect" skirts render the aircraft capable of flying over water, mud, swamp, smooth, soft terrain, or other conditions where movement on the powered wheels would be difficult or impracticable, at ground effect altitudes wherein the increased lift produced by "ground effect" phenomena would permit flying at its normal gross weight at substantially reduced power.

The ground effect skirts in either of the above-described embodiments may be retractable to provide reduced drag at high altitude or high speed flight. For example, the ground effect skirt units 63, 64 of FIGURE 9 may be rendered retractable by forming each skirt unit of telescoping sections 63a, 63b which may be contracted vertically to a selected extent and withdrawn upwardly into suitable wells 68 in the sides of the central section 12 of the chassis 11. The telescoping skirt units may be remotely controlled from the pilot's compartment or position by any conventional hydraulic remote control system, diagrammatically indicated by broken lines at 69 in FIGURE 9, which may, for example, include hydraulic cylinders having piston rods connected to telescoping sections of the framing members 65 and the inclined bracing rods 67 and valves controlled by the pilot to route hydraulic fluid to selected sides of the cylinders.

While several different specific embodiments of the present invention have been particularly shown and described, it will be apparent that other modifications can be made therein within the spirit and scope of the invention, and it is desired, therefore, that only such limitations be imposed thereon as are imposed by the prior art and set forth in the appended claims.

What is claimed is:

1. A flying platform aerial vehicle of the vertical take-off and landing type comprising a shallow, generally flat, platform-like chassis elongated in the fore-and-aft direction, including a pair of ducted lift rotor units, one at the leading end and one at the trailing end of the chassis for lifting the vehicle and sustaining the same in the air, each of said lift rotor units comprising a rotor having plural blades radiating from a rotor axis and a shroud wall encircling the rotor on all sides and defining a circular duct within which the rotor rotates oriented to provide resultant airflow emanating from the duct which will produce a substantially vertical lift force, a pilot's station on said chassis lying between the pair of rotor unit ducts approximately in the plane of rotation of at least one of the rotors power plant means for driving said rotors, means coupling said power plant means with the rotors to drive the rotors in oppositely related directions, said ducts each having a convexly curved annular inlet lip at the upper end thereof over which air is drawn upon rotation of the rotors to provide vertical and radial force components resulting from air flow along said lip, means located above each rotor including a tiltable spider member rotatable about the rotor axis and eccentrically connected to the rotor blades, and means controlled from said pilot's station for adjusting said spider means to select tilt positions to vary the cyclic pitch of the associated rotor for producing radial propulsive thrust components and tilting of the vehicle about its pitch and roll axes, and means controlled from said pilot's station for adjusting the spider members associated with each rotor to vary the differential collective pitch of the rotors for longitudinal control of the vehicle in flight.

2. A flying platform aerial vehicle of the vertical take-off and landing type comprising a shallow chassis elongated in a fore-and-aft direction in a generally flat, platform configuration having a principal plane adapted to be disposed in a near horizontal relation, said chassis including a pair of ducted lift rotor units, one at the leading end and one at the trailing end of the chassis for lifting the vehicle and sustaining the same in the air, each of said lift rotor units comprising a rotor having plural blades radiating from a rotor axis having a rotational axis substantially perpendicular to said principal plane and a shroud wall encircling the rotor on all sides in concentric relation to said rotational axis and defining a circular duct within which the rotor rotates, a pilot's station on said chassis lying between the pair of rotor unit ducts approximately in the plane of rotation of at least one of the rotors, power plant means for driving said rotors, means coupling said power plant means with the rotors to drive the rotors in oppositely related directions, said ducts each having a convexly curved annular inlet lip at the upper end thereof over which air is drawn upon rotation of the rotors to provide vertical and radial force components resulting from air flow along said lip, means located above each rotor including a spider member rotatable about the rotor axis of its associated rotor having radial projections connected to the rotor blades for regulating the pitch of the blades responsive to tilting of the spider member, adjustable rod members connected to the spider members of said rotors and controlled from said pilot's station for adjusting said spider members to selected tilt positions for varying the cyclic pitch of the rotor blades to provide longitudinal control and to cause unsymmetrical air flow through the associated duct and unbalance of the radial force components in selected directions to produce a propulsive force component in the principal plane of the chassis, and rod means connected to said spider members and adjustable from said pilot's station axially of the rotor axes for adjusting the axial positions of said spider members relative to the blades and thereby vary the differential collective pitch of the rotors to provide longitudinal control of the vehicle.

3. A flying platform aerial vehicle of the vertical take-off and landing type comprising a shallow, generally flat, platform-like chassis elongated in the fore-and-aft direction, including a pair of ducted lift rotor units, one at the leading end and one at the trailing end of the chassis for lifting the vehicle and sustaining the same in the air, each of said lift rotor units comprising a rotor having plural blades radiating from a rotor axis and a shroud wall encircling the rotor on all sides and defining a circular duct within which the rotor rotates oriented to provide resultant air flow emanating from the duct which will produce a substantially vertical lift force, power plant means for driving said rotors, means coupling said power plant means with the rotors to drive the rotors in oppositely related directions, said ducts each having a convexly curved annular inlet lip at the upper end thereof over which air is drawn upon rotation of the rotors to provide vertical and radial force components resulting from air flow along said lip, a pilot's station on said chassis lying between the pair of rotor unit ducts approximately in the plane of rotation of at least one of the rotors, means located above each rotor including a tiltable spider member rotatable about the rotor axis and eccentrically connected to the rotor blades, and means controlled from said pilot's station for adjusting said spider means to selected tilt positions to vary the cyclic pitch of the associated rotor for producing radial propulsive thrust components and tilting of the vehicle about its pitch and roll axes, and means controlled from said pilot's station for adjusting the spider members associated with each rotor to vary the differential collective pitch of the rotors for longitudinal control of the vehicle in flight, at least one transversely extending slip stream deflecting vane pivotally supported on said chassis at the exit end of each of said ducts substantially spanning the diameter of the duct, at least one longitudinally extending slip stream deflecting vane pivotally supported on said chassis at the exit end of each of said ducts substantially spanning the diameter of the duct, and control means operable from said pilot's control station for selectively adjusting said slip stream deflector vanes to inclined positions for deflecting the air stream from the rotors fore-and-aft or to either side of the vehicle to produce thrust in selected directions.

4. A flying platform aerial vehicle of the vertical take-off and landing type comprising a shallow chassis elongated in a fore-and-aft direction adapted to occupy a near horizontal attitude, a ducted lift rotor unit adjacent each of the leading and trailing ends of the chassis for producing forces to lift and sustain the vehicle in flight each including a rotor having a plurality of rotor blades extending radially from a common rotor axis, a shroud wall radially encircling the rotor on all sides and defining a circular duct within which the rotor rotates to produce substantially vertical lift forces, a driven hollow hub shaft disposed along said common axis and connected to the inner ends of said blades to rotate the same, means supporting said blades for angular adjustment in pitch about a spanwise axis of each blade, a collective pitch control tube supported for axial displacement along said common axis and located coaxially within said hollow hub shaft, a spider member having a plurality of radial arms corresponding in number to said blades located above said blades, a universal coupling member connecting said spider member with said control tube for axial displacement along said common axis and for angular tilting movement relative to said axis, a link member connecting an outer end of each of said radial arms spaced from said common axis with one of said blades at a point eccentric of the spanwise axis of the associated blade for adjusting the pitch of the blades in accordance with the axial position and the angular tilt position of said spider member, push-pull control rods disposed along axes divering radially from said common axis journalled at their inner ends to said spider member at a point spaced from said universal coupling member and projecting radially beyond said shroud wall for adjusting said spider member to selected tilt positions about said universal coupling member upon axial movement of said push-pull control rods to vary the cyclic pitch of said blades, a pilot's station on said chassis lying between the pair of rotor unit ducts approximately in the plane of rotation of at least one of the rotors, cyclic pitch control means at said pilot's station for axially adjusting said push-pull control rods to establish selected tilt positions of said spider member causing the pitch of the blades to be changed progressively as they rotate, and collective pitch control means at said pilot's station for adjusting the axial position of the spider member relative to the blades by axial adjustment of said collective pitch control tube to uniformly change the pitch of all of the rotor blades.

5. A flying platform aerial vehicle of the vertical take-off and landing type comprising a shallow, generally flat, platform-like chassis elongated in the fore-and-aft direction, including a pair of ducted lift rotor units, one at the leading end and one at the trailing end of the chassis for lifting the vehicle and sustaining the same in the air, each of said lift rotor units comprising a rotor having plural blades radiating from a rotor axis and a shroud wall encircling the rotor on all sides and defining a circular duct within which the rotor rotates oriented to provide resultant airflow emanating from the duct which will produce a substantially vertical lift force, a pilot's station on said chassis lying between the pair of rotor unit ducts approximately in the plane of rotation of at least one of the rotors, power plant means for driving said rotors, means coupling said power plant means with the rotors to drive the rotors in oppositely related directions, said ducts each having a convexly curved annular inlet lip at the upper end thereof over which air is drawn upon rotation of the rotors to provide vertical and radial force components resulting from air flow along said lip, means for varying the collective and cyclic pitch of each rotor from said pilot's station comprising a spider member mounted above its associated rotor disposed along the axis thereof and supported for rotation with the rotor and for angular tilting movement relative to said axis, means coupling said spider member at points spaced radially from said axis to each of the blades of said rotor for adjusting the blades in pitch spanwise of the blades responsive to tilting of the spider member, means including a pair of angularly related, axially adjustable rod members lying in a common plane and extending radially of said axis above said rotors to a point beyond the rotor periphery and connected to said spider member for tilting the same, and means for moving said spider member axially of said axis for varying the collective pitch of the rotor blades.

References Cited by the Examiner
UNITED STATES PATENTS
1,698,482   1/29   Nicin _____ 180—7
(Other references on following page)

UNITED STATES PATENTS

| | | | |
|---|---|---|---|
| 1,781,910 | 11/30 | Anker-Holth | 244—12 |
| 1,917,965 | 7/33 | Gerhardt | 170—160.25 |
| 1,967,461 | 7/34 | Ballew | 170—160.32 |
| 2,555,577 | 6/51 | Daland | 244—17.23 |
| 2,645,436 | 7/53 | Brown | 180—7 |
| 2,948,111 | 8/60 | Nelson | 244—34.1 |
| 2,953,321 | 9/60 | Robertson et al. | 244—23 |
| 2,955,780 | 10/60 | Hulbert | 244—23 |
| 2,967,029 | 1/61 | Hill | 244—23 |
| 2,968,453 | 1/61 | Bright | 244—12 |
| 2,995,192 | 8/61 | Scheutzow | 170—160.25 |
| 3,054,578 | 9/62 | Brocard | 244—23 |

OTHER REFERENCES

Design News, May 23, 1960, "Ground Cushion Vehicle Balances With Single Engine," page 6.

Aviation Week, Jan. 26, 1959, "Designers Face Flying Platform Controllability Problems," pp. 56–57, 59, 61, 65, 67.

Aviation Week, Mar. 10, 1958, "First Picture of Piasecki VTOL," p. 25.

FERGUS S. MIDDLETON, *Primary Examiner*.

MILTON BUCHLER, *Examiner*.